June 23, 1931.   K. W. ATWATER   1,811,703
BEARING
Filed July 29, 1929   2 Sheets-Sheet 1
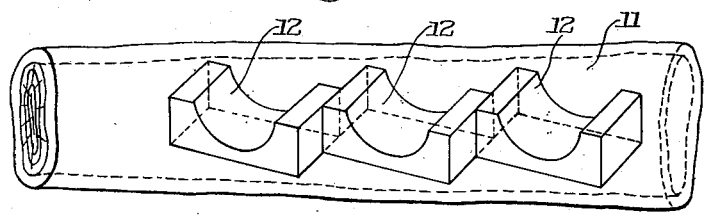
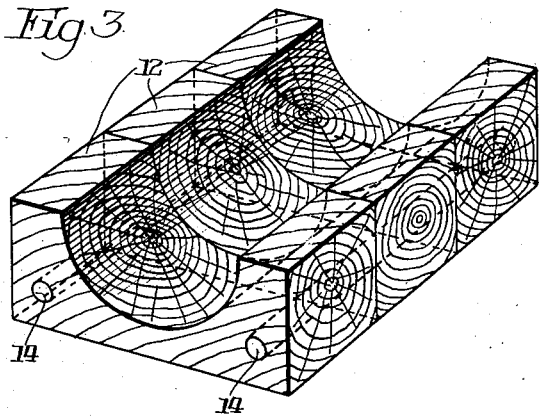
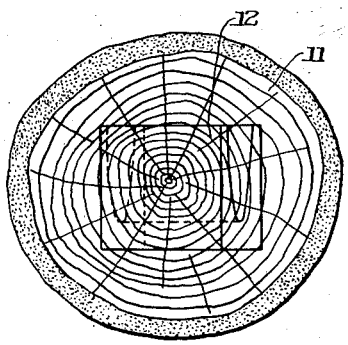
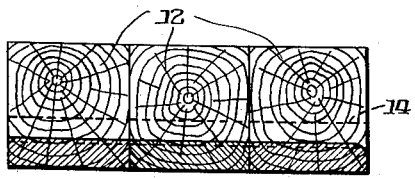
Inventor:
Karl W. Atwater
By Wilkinson Huxley Byron & Knight Attys June 23, 1931. K. W. ATWATER 1,811,703
BEARING
Filed July 29, 1929    2 Sheets-Sheet 2
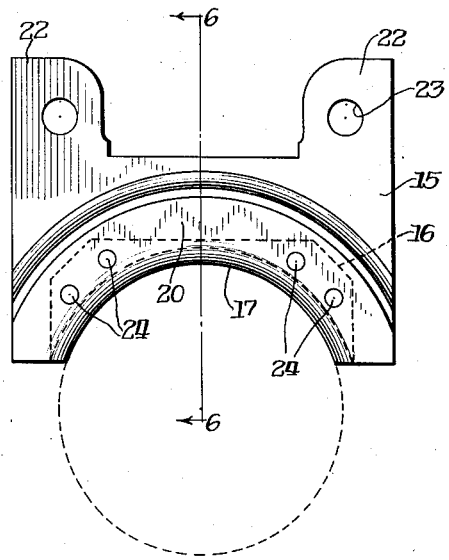
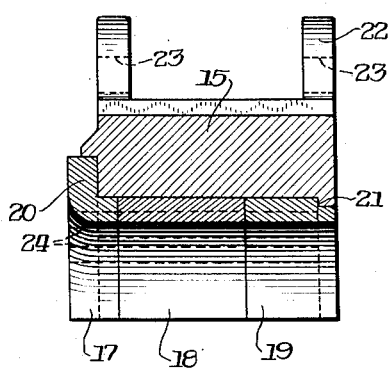
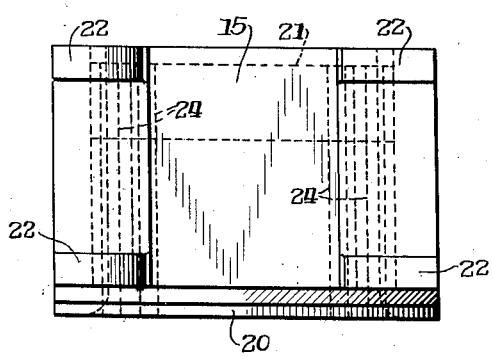
Inventor
Karl W. Atwater.
By Wilkinson, Huxley, Byron & Knight Attys Patented June 23, 1931

1,811,703

UNITED STATES PATENT OFFICE

KARL W. ATWATER, OF CHICAGO, ILLINOIS, ASSIGNOR TO H. A. BRASSERT & COMPANY, OF CHICAGO, ILLINOIS, A CORPORATION OF ILLINOIS

BEARING

Application filed July 29, 1929. Serial No. 381,844.

This invention relates to a new and improved bearing and more particularly to a non-metallic bearing of a type adapted for use in heavy machinery such as rollings mills or the like.

Bearings now in general use in rolling mills are formed of metal and require constant lubrication as well as the constant application of a flow of cooling water. The bearings have a comparatively short life and are expensive both in initial cost and in cost of maintenance.

According to the present invention, I provide bearings of a wood containing a natural lubricant and having a density sufficient to adapt it to resist the heavy stresses and the wear incident to such service. More specifically, I prefer to use a lignum vitæ having a specific gravity of from 1.42 to 1.58 which I have found to give better service without lubrication than has been given heretofore by the usual metal bearings with lubrication. Furthermore, the co-efficient of friction of such wooden bearings is less than that of the lubricated metal bearings. I have found it important that the lignum vitæ have a specific gravity within substantially the limits given above so as to insure not only the required density but also the required content of the natural lubricant in the wood. It will be understood that while such bearings do not require lubrication, they are properly water-cooled as is customary in ordinary mill practice.

Additional features of my invention relate to a construction of large bearings of a plurality of pieces and to the method of cutting the bearings from the logs.

It is an object of the present invention to provide a new and improved non-metallic bearing adapted for heavy duty service.

It is a further object to provide a bearing of a wood containing a natural lubricant so as to render lubrication during use unnecessary.

It is also an object to provide a bearing formed of a wood having certain characteristics as to specific density.

It is an additional object to provide a manner of cutting the bearings from the logs and of assembling a large bearing from a plurality of pieces.

Other and further objects will appear as the description proceeds.

I have shown certain preferred embodiments of my invention in the accompanying drawings, in which—

Figure 1 is a diagrammatic showing of the manner of cutting the bearing elements from a log;

Figure 2 is an end view of the method of cutting shown in Figure 1;

Figure 3 is a perspective view of an assembled bearing;

Figure 4 is a longitudinal section of the bearing of Figure 3;

Figure 5 is a face view of a bearing housed in a metal supporting member;

Figure 6 is a section taken on line 6—6 of Figure 5; and

Figure 7 is a plan view of the bearing shown in Figure 5.

Referring first to Figures 1 and 2, the log 11 of the preferred kind of wood has cut from it a plurality of bearing elements 12, these elements extending approximately longitudinally of the log. The bearings are preferably not cut exactly longitudinally but at a slight angle to the longitudinal axis of the log. This causes the grain of the wood to be located in the finished bearing elements substantially as shown in Figure 3.

The heart or center of the log is located in the lateral bearing faces of the bearing seat but not directly opposite on the two sides of the seat. Furthermore, the grain throughout the bearing seat is at an angle so as to present an edge grain to the thrusts of the shaft or roll neck. This shaft or roll neck in the case of rolling mills, subjects the bearing to a downward compressive stress due to the weight of the bearing and the screw-down of the neck against the bearing. It also presents a lateral thrust against the bearing due to the lateral thrust against the rolls caused by the metal passing between the rolls. In addition, there is an endwise thrust due to the tendency of the rolls to move laterally. Because of this diagonal cut of the bearing elements, they also present an end grain on the edge of the elements, so that this lateral thrust is taken up against an end grain face.

As shown in Fig. 3, the several elements 12 are secured together by dowel pins 14 which extend longitudinally of the bearing.

In the form of construction shown in Figures 5, 6 and 7, a metal housing member 15 provides a seat for receiving the wooden bearing elements. This seat as shown, has the corners filled in as indicated at 16 so as to reduce the amount of wood necessary, and to present an additional thrust face without sharp corners on the wood.

As best shown in Figure 6, the supporting member 15 carries three bearing sections 17, 18 and 19. The section 17 is provided with the upwardly extending flange portion 20 adapted to take up the endwise thrust of the roll neck. The intermediate section 18 is similar to the section shown in Figures 1 to 4, with the exception that the corners are chamfered to fit against the portions 16 of the holder. The bearing section 19 is recessed to fit against the shoulder 21 formed on the supporting member 15, this shoulder preventing longitudinal movement of the bearing sections 18 and 19. The supporting member 15 is shown as provided with the ears 22 provided with the openings 23 for securing the member in place upon the roll stand or similar portion of the apparatus. The sections 17, 18 and 19 are secured together by the dowel pins 24.

While I have shown certain preferred forms of my invention, these are to be considered as illustrative only, as my improved bearing may be changed and modified to meet varying conditions, and I contemplate such changes and modifications as come within the spirit and scope of the appended claims.

I claim:

1. A bearing for rolling mills formed of a dense hard wood containing a natural lubricant, the bearing having the grain running approximately transversely of the bearing seat.

2. A bearing for rolling mills formed of a dense hard wood containing a natural lubricant, the bearing having the grain running approximately transversely of the bearing seat and with the center of the log located in the lateral faces of the seat.

3. A bearing for rolling mills formed of a dense hard wood containing a natural lubricant, the bearing having the grain running approximately transversely of the bearing seat and comprising a plurality of pieces of wood, each extending the full width of the bearing.

4. A bearing for rolling mills formed of a dense hard wood containing a natural lubricant, the bearing having the grain running approximately transversely of the bearing seat and comprising a plurality of pieces of wood, each extending the full width of the bearing, the piece at one end having an extended shoulder to receive lateral thrust.

5. A bearing for rolling mills formed of a dense hard wood containing a natural lubricant, the bearing having the grain running approximately transversely of the bearing seat and comprising a plurality of pieces of wood, each extending the full width of the bearing, the several pieces being held together by dowel pins extending longitudinally of the bearing.

Signed at Chicago, Illinois, this 23rd day of July, 1929.

KARL W. ATWATER.